(12) United States Patent
Yang et al.

(10) Patent No.: US 9,427,856 B2
(45) Date of Patent: Aug. 30, 2016

(54) THREADING DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Xin Liu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 127 days.

(21) Appl. No.: 14/524,128

(22) Filed: Oct. 27, 2014

(65) Prior Publication Data

US 2015/0113781 A1    Apr. 30, 2015

(30) Foreign Application Priority Data

Oct. 31, 2013    (CN) ...................... 2013 2 0677758 U

(51) Int. Cl.
*B23P 19/04*    (2006.01)
*B25B 27/14*    (2006.01)
*C25D 11/02*    (2006.01)

(52) U.S. Cl.
CPC .............. *B25B 27/143* (2013.01); *B23P 19/04* (2013.01); *C25D 11/022* (2013.01); *Y10T 29/53691* (2015.01)

(58) Field of Classification Search
CPC ....... B23P 19/12; B25B 27/02; B25B 27/06; B25B 27/143
See application file for complete search history.

(56) References Cited

U.S. PATENT DOCUMENTS

| | | | | |
|---|---|---|---|---|
| 2,969,588 A * | 1/1961 | Stephens | ............... | B25B 27/143 29/240.5 |
| 2,997,782 A * | 8/1961 | Eddy | ..................... | B25B 27/143 29/240.5 |
| 3,040,423 A * | 6/1962 | Brancato | ............... | B25B 27/143 29/240.5 |
| 3,178,810 A * | 4/1965 | Simmonds | ............ | B25B 27/143 29/240.5 |
| 4,980,959 A * | 1/1991 | Czarnowski | ............ | B25B 23/00 29/227 |
| 5,678,970 A * | 10/1997 | Caulk | .................... | B21J 15/025 29/432.2 |
| 8,769,789 B2 * | 7/2014 | Bathurst | ................. | B23P 11/00 29/243 |
| 2001/0024044 A1 * | 9/2001 | Kosuge | ................. | B23P 19/043 294/28 |
| 2004/0112179 A1 * | 6/2004 | Newton | ............... | B23P 19/048 81/57.11 |
| 2008/0066286 A1 * | 3/2008 | Saathoff | ................. | B21J 15/025 29/432.1 |

\* cited by examiner

*Primary Examiner* — Joseph J Hail
*Assistant Examiner* — Tyrone V Hall, Jr.
(74) *Attorney, Agent, or Firm* — Zhigang Ma

(57) ABSTRACT

The threading device includes a thread-pushing rod, a thread-transmitting rod, a first transmission subassembly, a second transmission subassembly, and a first pushing member. The thread-pushing rod defines a first through hole. The thread-transmitting rod is mounted on the thread-pushing rod and defines a second through hole. The first transmission subassembly includes a first rotating member and a spur gear mounted on the first rotating member. The second transmission subassembly includes a second rotating member and a second spur gear mounted on the second rotating member. The second spur gear meshes the first spur gear. A passage is defined by the first rotating member and the second rotating member. A tangent of the passage is aligned with the first through hole and the second through hole. The first pushing member is coupled to the first rotating member and configured to rotate the first rotating member.

20 Claims, 10 Drawing Sheets

THREADING DEVICE

FIELD

The present disclosure relates to threading devices, particularly to a threading device configured to push a thread into a hole of a workpiece to block the hole.

BACKGROUND

Before continuing certain processes of manufacturing a workpiece, such as before anodizing, small sized holes of the workpiece need to be blocked. The holes of the workpiece are usually manually blocked. However, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
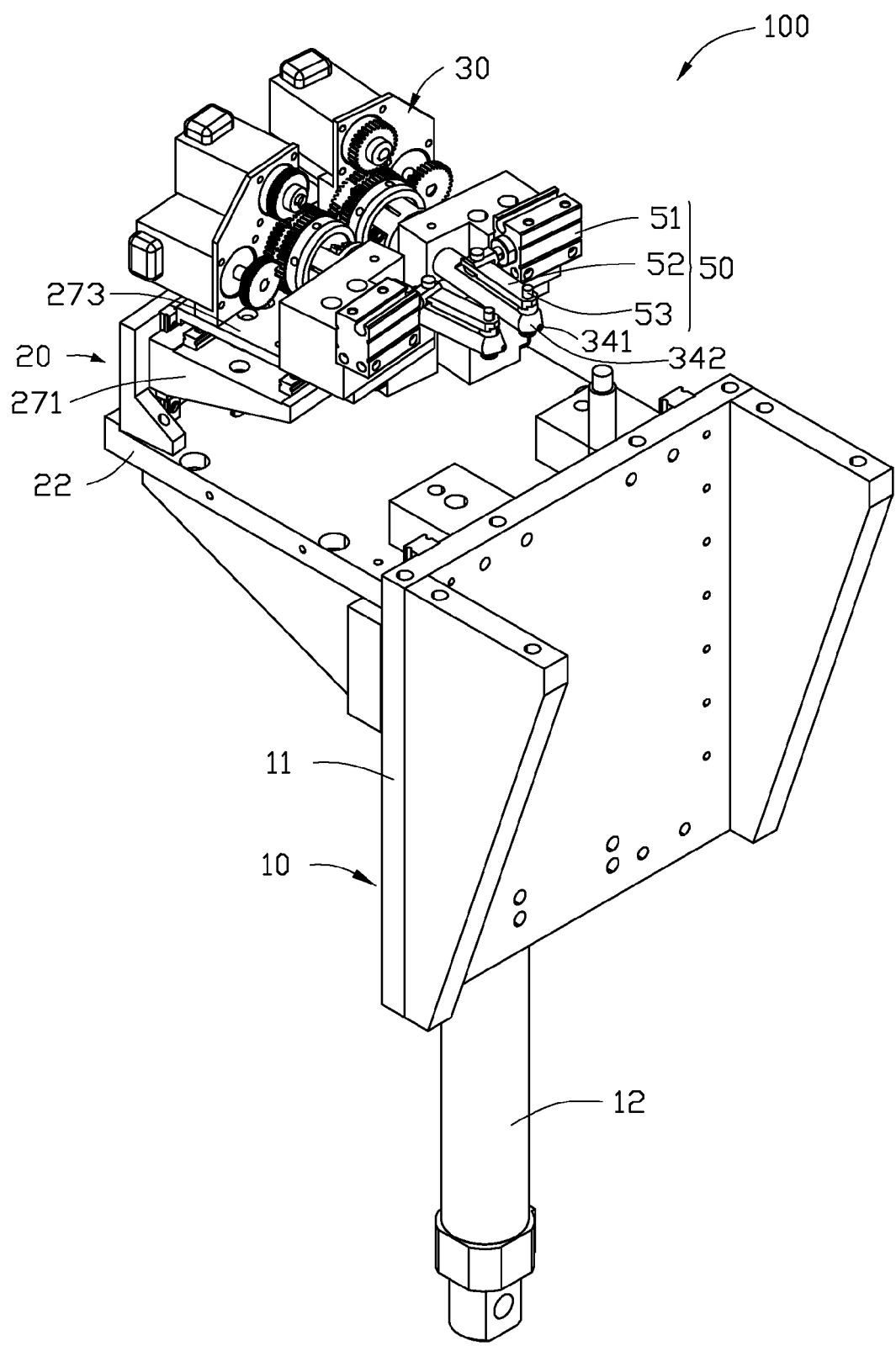
FIG. 1 is an isometric view of an embodiment of a threading device including a rough positioning mechanism, a transmitting mechanism, and a cutting mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a threading device and can include a thread-pushing rod, a thread-transmitting rod, a first transmission subassembly, a second transmission subassembly, and a first pushing member. The thread-pushing rod can define a first through hole. The thread-transmitting rod can be mounted on the thread-pushing rod and define a second through hole. The first through hole can be aligned with the second through hole. The first transmission subassembly can include a first rotating member and a spur gear mounted on the first rotating member. The second transmission subassembly can include a second rotating member and a second spur gear mounted on the second rotating member. The first rotating member can be parallel with the second rotating member. The second spur gear can mesh the first spur gear. A passage can be defined by the first rotating member and the second rotating member. The passage can be configured for a thread to pass through. A tangent of the passage can be aligned with the first through hole and the second through hole. The first pushing member can be coupled to the first rotating member and configured to rotate the first rotating member.

Figure 2:
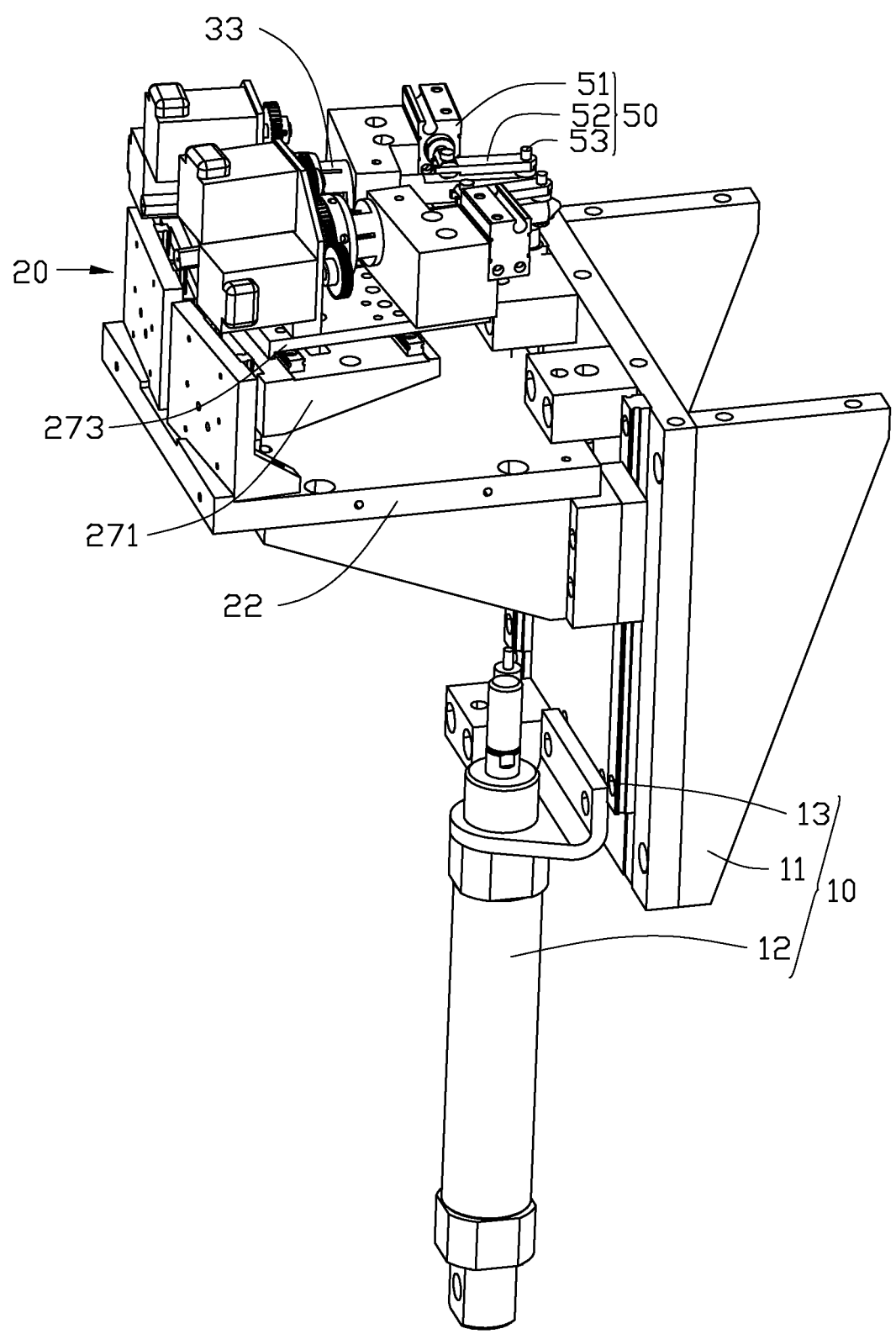
FIG. 2 is similar to FIG. 1, but shown from another angle.

FIGS. 1-2 illustrate an embodiment of a threading device 100. The threading device 100 can be configured to push a thread 200 (shown in FIG. 4) into a hole (not shown) of a workpiece (not shown), to block the hole.

The threading device 100 can include a rough positioning mechanism 10, an accurate positioning mechanism 20, a transmitting mechanism 30, and a cutting mechanism 50. The rough positioning mechanism 10 can be mounted on a worktable (not shown) and be configured to position the transmitting mechanism 30 in vertical direction. The accurate positioning mechanism 20 can be slidably mounted on the rough positioning mechanism 10 and be configured to position the transmitting mechanism 30 accurately in vertical and horizontal direction. The transmitting mechanism 30 can be coupled to the accurate positioning mechanism 20 and be configured to push the thread 200 into the hole of the workpiece. The cutting mechanism 50 can be mounted on the transmitting mechanism 30 and be configured to cut the thread 200.

The rough positioning mechanism 10 can include a supporting platform 11, a cylinder 12, and two sliding rails 13 parallel with each other. The supporting platform 11 can be mounted on the worktable. The sliding rails 13 can be vertically mounted on the supporting platform 11. The cylinder 12 can be mounted on an end portion of the supporting platform 11 and can drive the supporting platform 11 to move in vertical direction. In an alternative embodiment, a number of the sliding rails 13 can be one or more than two.

Figure 3:
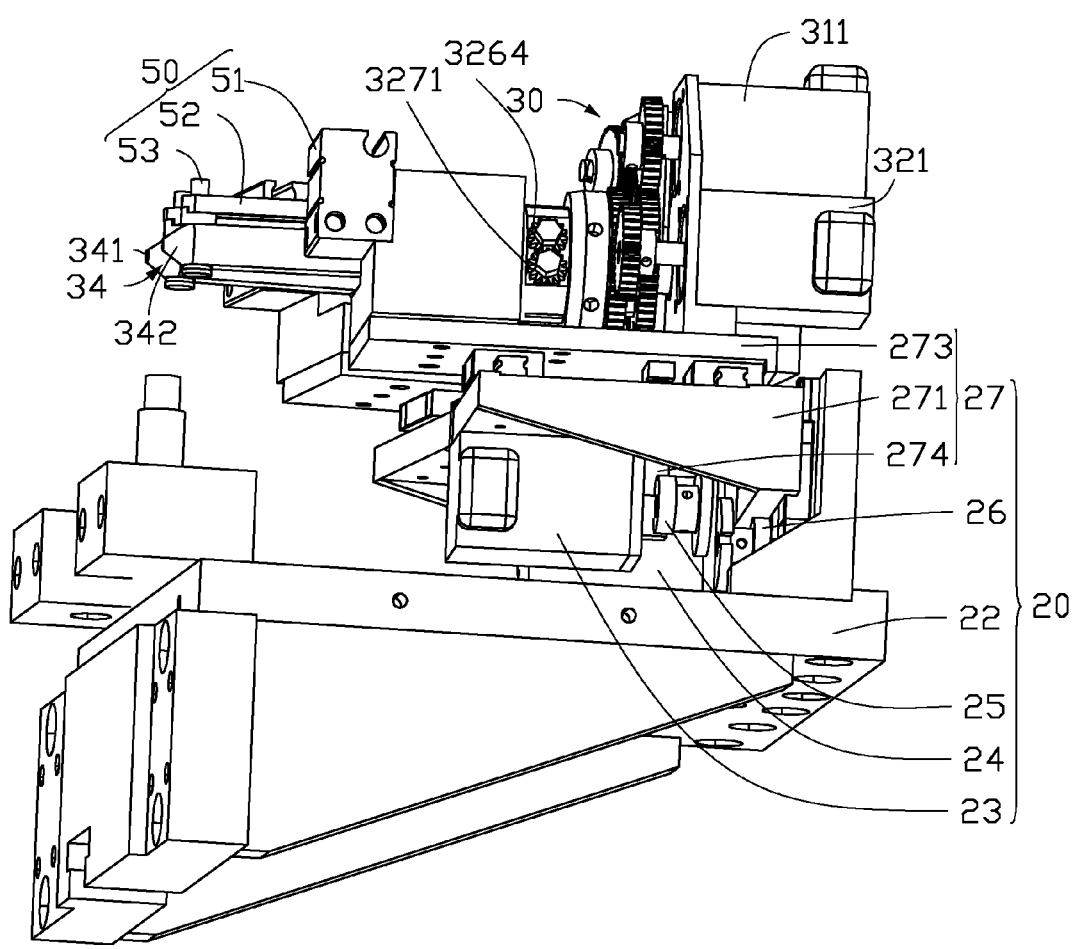
FIG. 3 is an isometric view of the threading device without the rough positioning mechanism of FIG. 1.
Figure 4:
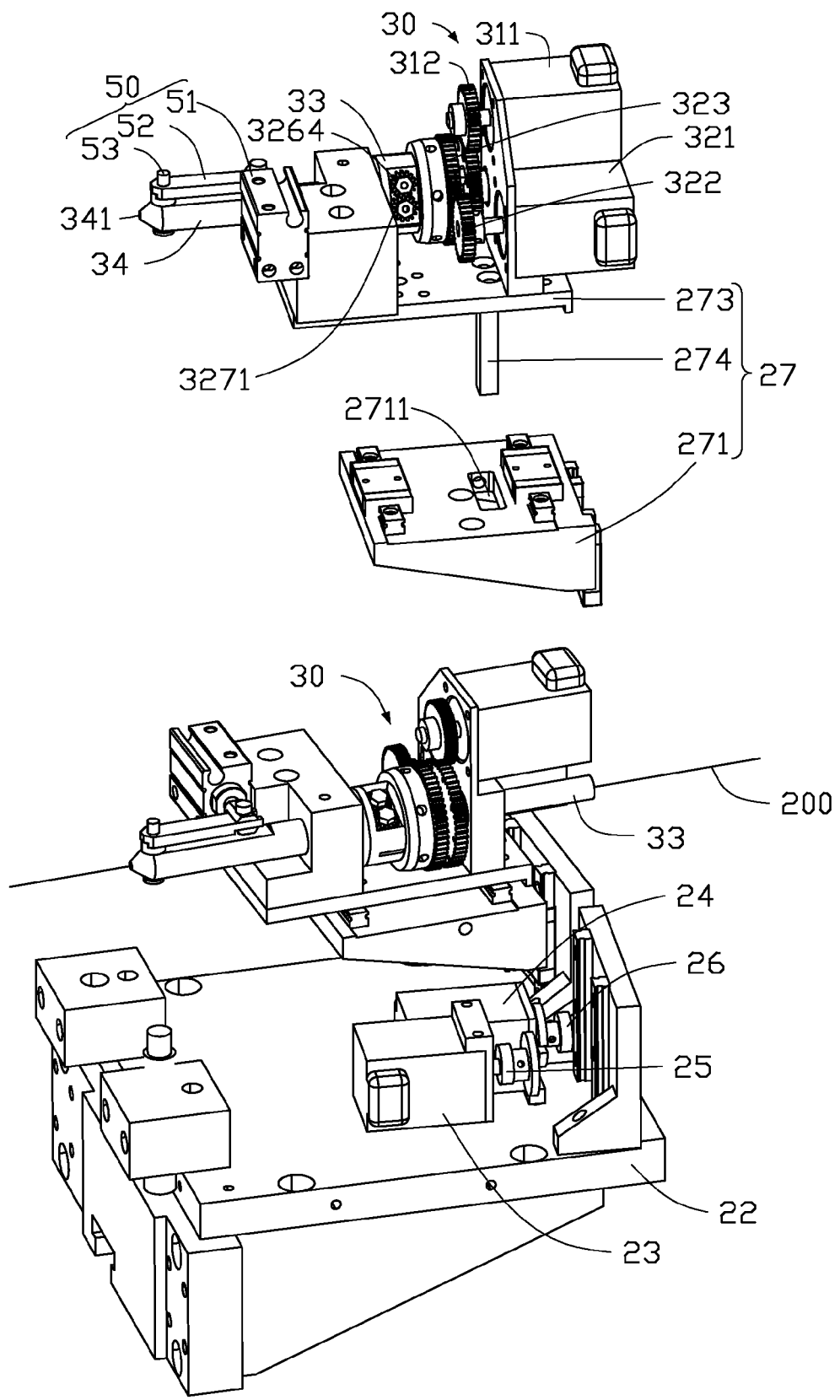
FIG. 4 is an exploded, isometric view of the threading device without the rough positioning mechanism of FIG. 1.

FIGS. 3-4 illustrate that the accurate positioning mechanism 20 can include a first sliding platform 22, a first driving member 23, a second driving member 24, a first eccentric wheel 25, a second eccentric wheel 26, and a moving assembly 27. The first sliding platform 22 can be substantially "Z" shaped. A first end portion of the first sliding platform 22 can be slidably mounted on the sliding rails 13. The cylinder 12 can drive the first sliding platform 22 to slide along the sliding rails 13. The first driving member 23 and the second driving member 24 can be mounted on the first sliding platform 22. The first eccentric wheel 25 can be coupled to the first driving member 23 and be driven by the first driving member 23. The second eccentric wheel 26 can be coupled to the second driving member 24 and be driven by the second driving member 24. The moving assembly 27 can be slidably mounted on the first sliding platform 22. The first eccentric wheel 25 and the second eccentric wheel 26 can resist the moving assembly 27. The moving assembly 27 can include a second sliding platform 271, a third sliding platform 273, and a moving rod 274 perpendicularity mounted on the third sliding platform 273. The second sliding platform 271 can define a moving hole 2711. The second sliding platform 271 can be slidably mounted on a second end portion of the first sliding platform 22 away from the supporting platform 11. The third sliding platform 273 can be slidably mounted on the second sliding platform 271. The moving rod 274 can pass through the moving hole 2711 of the second sliding platform 271 and move along the moving hole 2711. In at least embodiment, the first driving member 23 and the second driving member 24 can be motors.

An edge of the first eccentric wheel 25 can resist a sidewall of the moving rod 274. When the first driving member 23 drives the first eccentric wheel 25 to rotate, the first eccentric wheel 25 can push the moving rod 274 along the moving hole 2711 to move the third sliding platform 273 along horizontal direction, to position the transmitting mechanism 30 horizontally. An edge of the second eccentric wheel 26 can resist a bottom of the second sliding platform 271 (shown in FIG. 3). When the second driving member 24 drives the second eccentric wheel 26 to rotate, the second eccentric wheel 26 can push the second sliding platform 271 move along the sliding rails 13, to position the transmitting mechanism 30 vertically.

Figure 5:
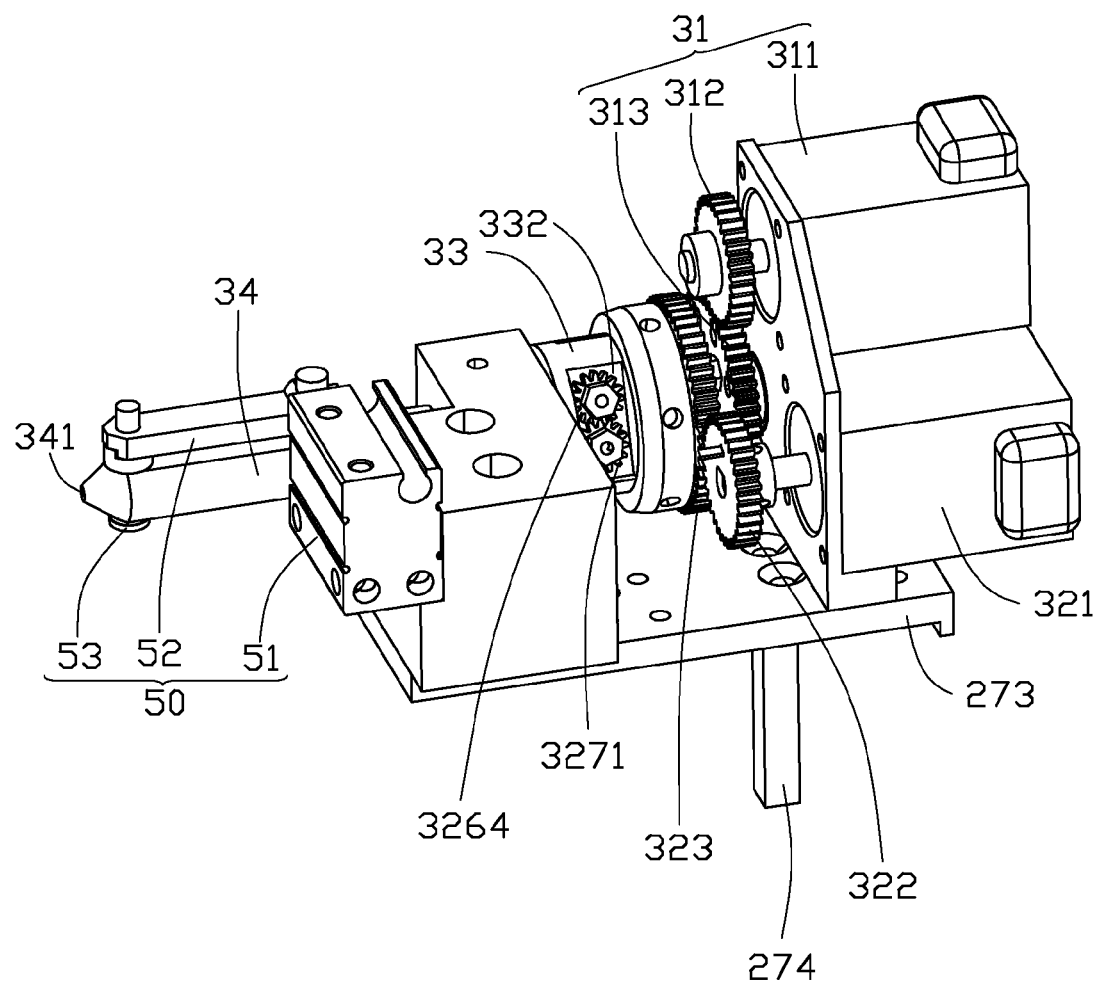
FIG. 5 is an isometric view of the transmitting mechanism and the cutting mechanism of FIG. 1, the transmitting mechanism includes a thread-pushing rod, a thread-transporting rod, a first transmission subassembly, and a second transmission subassembly, the cutting mechanism includes a cutting member.
Figure 6:
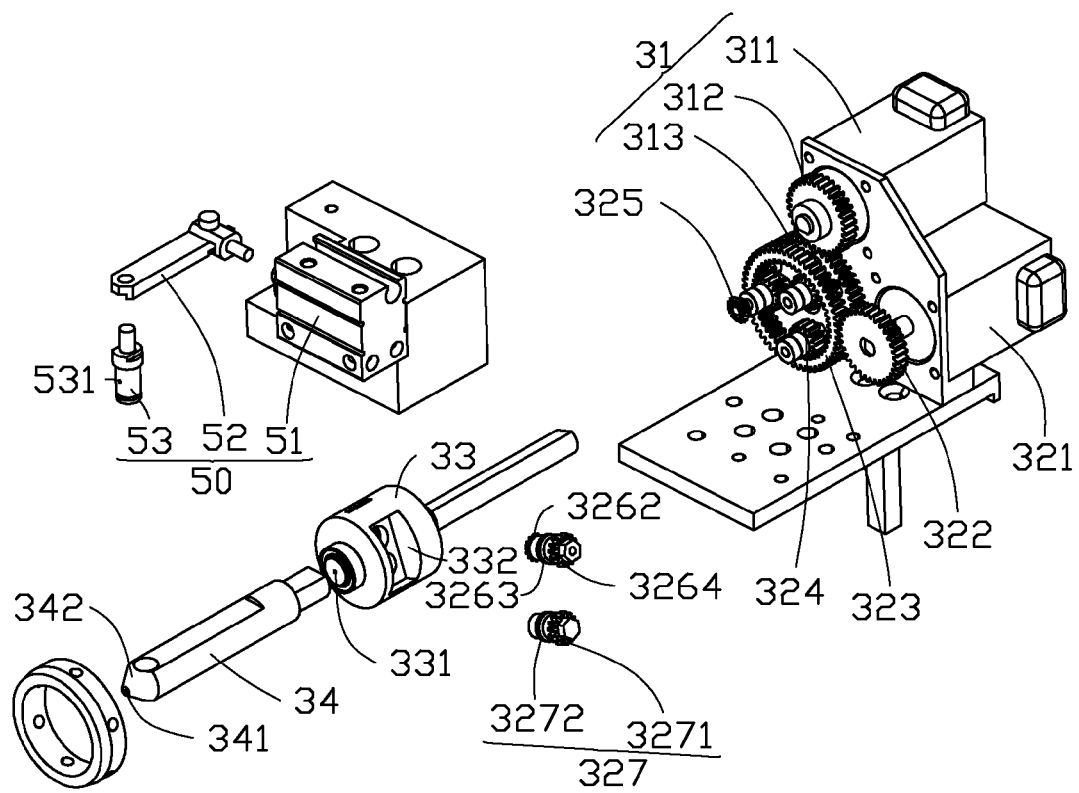
FIG. 6 is an exploded, isometric view of the transmitting mechanism and the cutting mechanism of FIG. 5.

FIG. 5-6 illustrate that the transmitting mechanism 30 can include a rotating assembly 31, a transmission assembly 32, a thread-pushing rod 33, and a thread-transmitting rod 34. The rotating assembly 31 and the transmission assembly 32 can be mounted on the third sliding platform 273 and be configured to push the thread 200 into the hole of the workpiece. The thread-pushing rod 33 can be coupled to the rotating assembly 31. The thread-transmitting rod 34 can be mounted on the thread-pushing rod 33. An axis of the thread-pushing rod 33 can coincide with an axis of the thread-transmitting rod 34.

Figure 7:
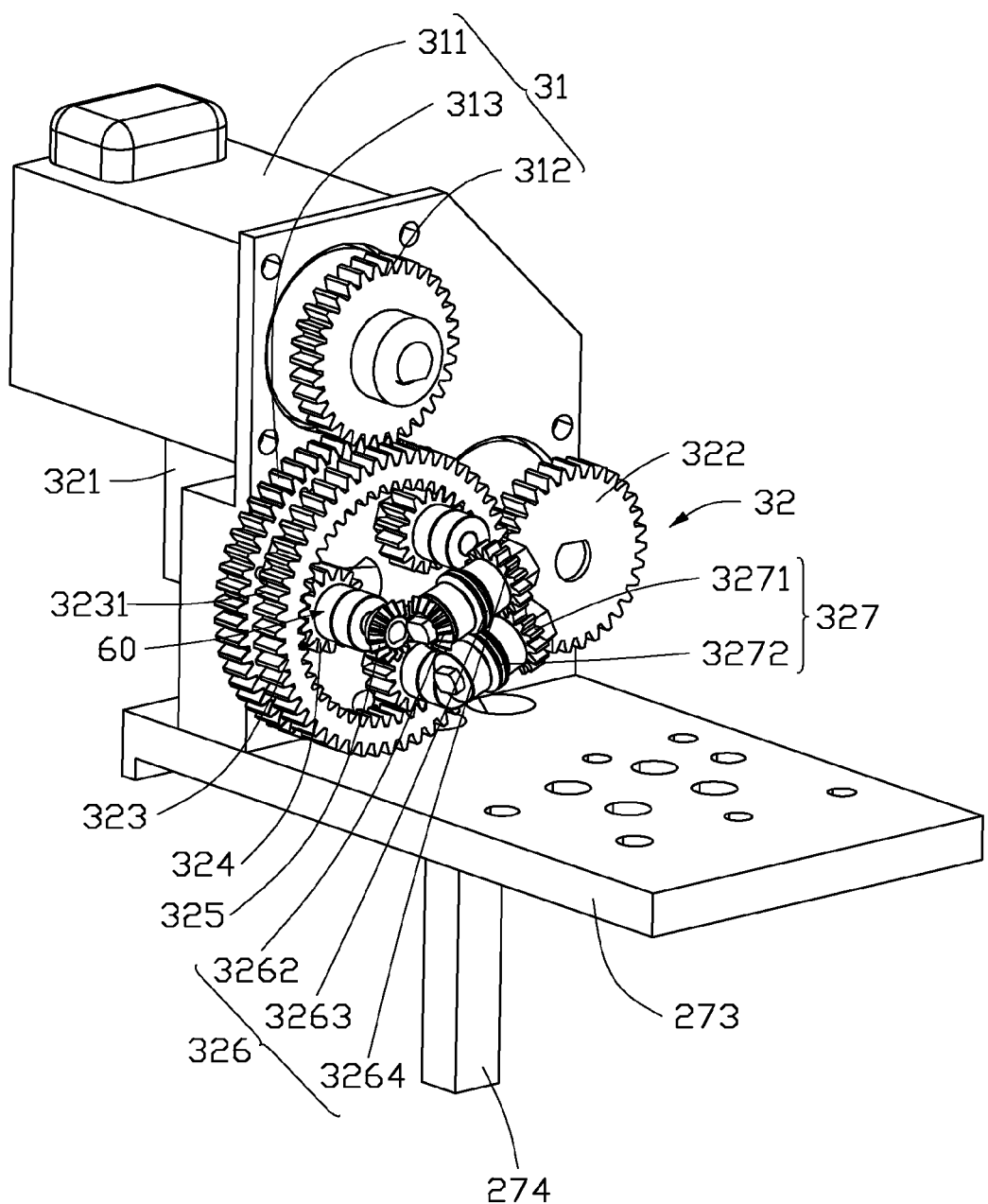
FIG. 7 is an isometric view of the transmitting mechanism without the thread-pushing rod and the thread-transmitting rod of FIG. 5.

FIG. 7 illustrates that the rotating assembly 31 can include a third driving member 311, a first gear 312, and a second gear 313. The third driving member 311 can be mounted on the third sliding platform 273. The first gear 312 can be coupled to the third driving member 311 and be rotated by the third driving member 311. The second gear 313 can mesh the third gear 312. The transmission assembly 32 can include a first pushing member 321, a third gear 322, a fourth gear 323, three mounting gears 324, a first bevel gear 325, a first transmission subassembly 326, and a second transmission subassembly 327. The first pushing member 321 can be mounted on the third sliding platform 273. The third gear 322 can be coupled to the first pushing member 321 and be rotated by the first pushing member 321. The fourth gear 323 can be circular. Teeth 3231 can be defined at an outer wall and an inner wall of the fourth gear 323. The teeth 3231 on the outer wall of the fourth gear 323 can mesh the third gear 322. The mounting gears 324 can be set around an axis of the second gear 313 and be mounted on the second gear 313 via a locking member 60 (shown in FIG. 7). The mounting gears 324 can mesh the teeth 3231 on the inner wall of the fourth gear 323. The first bevel gear 325 can be coupled to a mounting gear 324 and an axis of the first bevel gear 325 can coincide with an axis of the mounting gear 324. The first transmission subassembly 326 and the second transmission subassembly 327 can be parallel with each other. The first transmission subassembly 326 can include a second bevel gear 3262, a first rotating member 3263, and a first spur gear 3264. The second bevel gear 3262, the first rotating member 3263, and the first spur gear 3264 can be mounted in turn and be coaxial to each other. The second bevel gear 3262 can mesh the first bevel gear 325. An axis of the second bevel gear 3262 can be perpendicular with an axis of the first bevel gear 325. The second transmission subassembly 327 can include a second spur gear 3271 and a second rotating member 3272. The second spur gear 3271 and the second rotating member 3272 can be coaxially mounted with each other. The second spur gear 3271 can mesh the first spur gear 3264. In at least one embodiment, the third driving member 311 and the first pushing member 321 can be motors.

When the third driving member 311 rotates the first gear 312, the first gear 312 can rotate the second gear 313, and then the second gear 313 can rotate the mounting gears 324 around the axis of the second gear 313. When the pushing member 322 rotates the third gear 322, the third gear 322 can rotate the fourth gear 323, and then the fourth gear 323 can rotate the mounting gear 324 coupled to the first bevel gear 325 around the axis of the mounting gear 324. Because the first bevel gear 325 is coupled to the mounting gear 324, the first bevel gear 325 can synchronously rotate with the mounting gear 324 while the mounting gear 324 revolves on its own axis. The first bevel gear 325 can rotate the second gear 3262 around the axis of the second gear 3262, and then the first rotating member 3263 and the first spur gear 3264 can synchronously rotate with the second gear 3262. The first spur gear 3264 can rotate the second spur gear 3271 meshing the first spur gear 3264, to rotate the second rotating member 3272. The first rotating member 3263 and the second rotating member 3272 can rotate in different directions. At a contacting position of the first rotating member 3263 and the second rotating member 3272, a tangent of a rotating direction of the first rotating member 3263 or a tangent of a rotating direction of the second rotating member 3272 can be moved in a direction towards the thread-transmitting rod 34.

Figure 8:
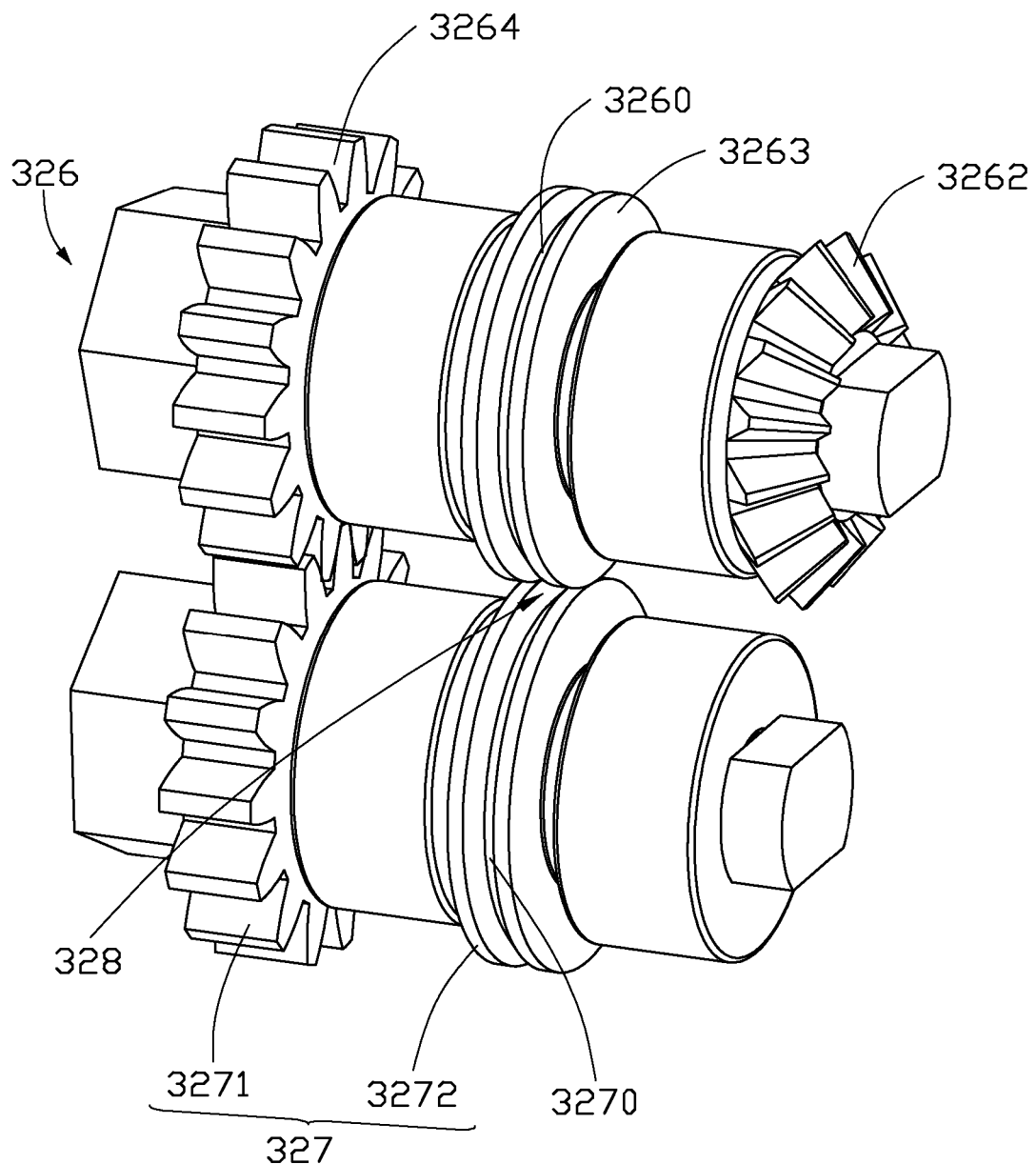
FIG. 8 is an isometric view of the first transmission subassembly and the second transmission subassembly of FIG. 5.

FIG. 8 illustrates that the first rotating member 3263 and the second rotating member 3272 can be substantially cylindrical. The first rotating member 3263 can be parallel with the second rotating member 3272 and resist the rotating member 3272. The first rotating member 3263 can define a first groove 3260 at a middle. The second rotating member 3272 can define a second groove 3270 at a middle. The first groove 3260 and the second groove 3270 can cooperatively define a passage 328. In at least one embodiment, the first groove 3260 and the second groove 3270 can be ring-shaped grooves.

The thread-pushing rod 33 can be mounted on the second gear 313 and extend along an axis of the second gear 313. The thread-pushing rod 33 can define a first through hole 331 along the axis of the second gear 313. The thread-pushing rod 33 can define a receiving groove 332 to receive the first transmission subassembly 326 and the second transmission subassembly 327. The thread-transmitting rod 34 can define a second through hole 341 along an axis of the thread-transmitting rod 34. An axis of the second through hole 341, an axis of the first through hole 331, and a tangent of the passage 328 can coincide with each other. The thread-transmitting rod 34 can define a beveled surface 342 at a first end. A second end portion of the thread-transmitting rod 34 can be mounted on the thread-pushing rod 33 away from the second gear 313. The axis of the thread-transmitting rod 34 can coincide with the axis of the thread-pushing rod 33.

Figure 9:
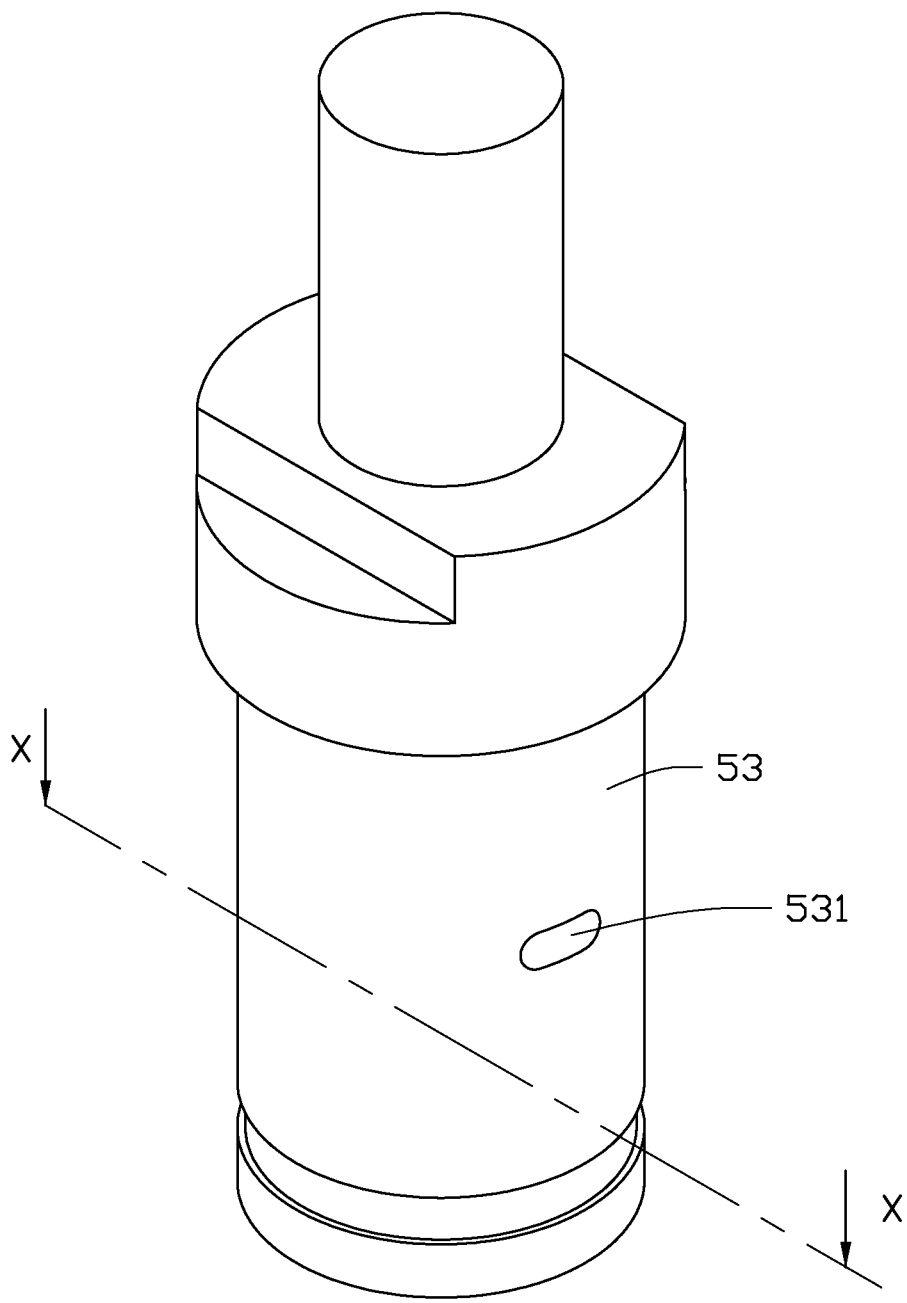
FIG. 9 is an enlarged view of the cutting member defining a cutting hole of FIG. 5.
Figure 10:
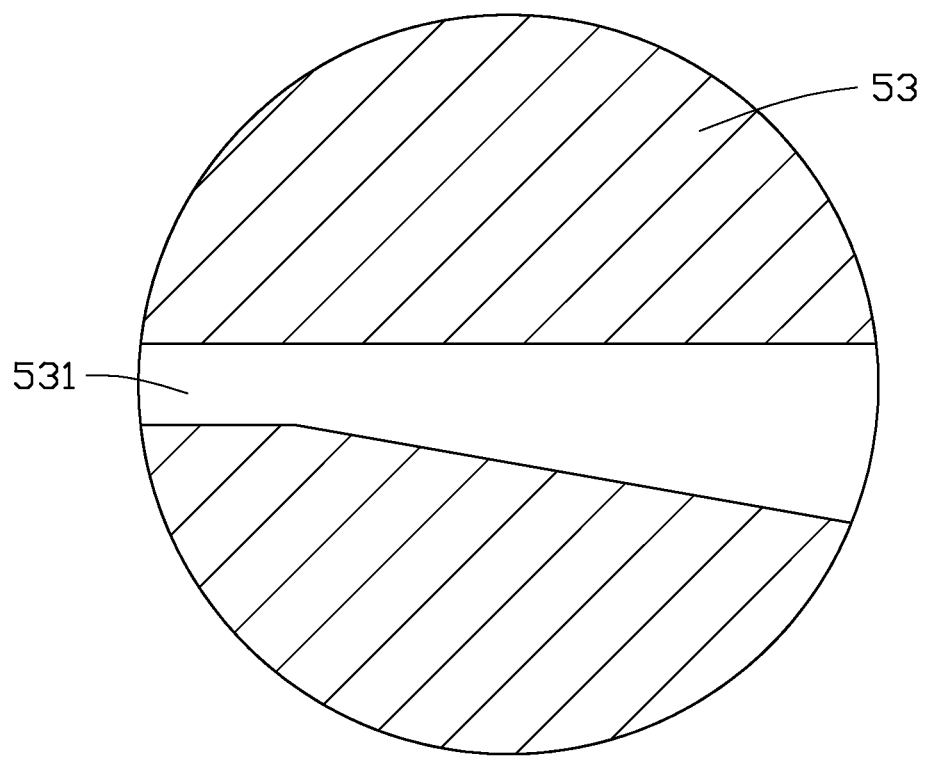
FIG. 10 is a cross-sectional view of the cutting member of FIG. 9, taken along line X-X.

The cutting mechanism 50 can include a second pushing member 51, a coupling rod 52, and a cutting member 53. The cutting member 53 can perpendicularly and rotatably pass through the first end portion of the thread-transmitting rod 34. Ends of the coupling rod 52 can be respectively coupled to the second pushing member 51 and the cutting member 53. The cutting member 53 can be substantially cylindrical. The cutting member 53 can define a cutting hole 531 at a middle (shown in FIG. 9). The cutting hole 531 can be a through hole. A diameter of a first end portion of the cutting hole 531 can be less than that of a second end portion of the cutting hole 531 (shown in FIG. 10). The first end portion of the cutting hole 531 can be adjacent to the first end portion of the thread-transmitting rod 34. In at least one embodiment, the second pushing member 51 can be a motor.

In assembly, the first sliding platform 22 can be slidably mounted on the sliding rails 13. The second sliding platform 271 can be slidably mounted on the first sliding platform 22. The third sliding platform 273 can be slidably mounted on the second sliding platform 271. The moving rod 274, mounted on the third sliding platform 273 can moveably pass through the moving hole 2711 of the second sliding platform 271. The rotating assembly 31 and the transmission assembly 32 can be mounted on the third sliding platform 273. The thread-pushing rod 33 can be mounted on the second gear 313 along the axis of the second gear 313. The first transmission subassembly 326 and the second transmission subassembly 327 can be received in the receiving groove 331 of the thread-pushing rod 33. The thread-transmitting rod 34 and the thread-pushing rod 33 can be coaxially mounted with each other. The cutting member 53 can pass through the first end portion of the thread-transmitting rod 34 and an axis of the cutting hole 531 can coincide with the axis of the second through hole 341.

In use, the thread 200 can be passed through the first through hole 331 of the thread-pushing rod 33. Using a robotic controlling device (not shown) detects data of the hole of the workpieces. The robotic controlling device can analysis the data detected by the robotic controlling device. The robotic controlling device can control the threading device 100 according the data. During control of the robotic controlling device, the cylinder 12 can drive the first sliding platform 22 to slide along the sliding rails 13, to position the first sliding platform 22 in vertical direction. After primary position has been achieved, the robotic controlling device can control the second driving member 24 to rotate the second eccentric wheel 26. The second eccentric wheel 26 can drive the second sliding platform 271 to move in vertical direction, to align the axis of the second through hole 341 of the thread-transmitting rod 34 and the hole of the workpiece in a same horizontal line. At the same time, the robotic controlling device can control the first driving member 23 to rotate the first eccentric wheel 25. The first eccentric wheel 25 can push the moving rod 274 move along the hole 2511, so the third sliding platform 273 can move towards the same direction aligning the second through hole 341 closest to the beveled surface 342 aligned with the hole of the workpiece. After the vertical direction position is achieved, the robotic controlling device can control the third driving member 311 to rotate the first gear 312 and control the first pushing member 321 to rotate the third gear 322. When the first gear 312 rotates, the second gear 313 can rotate with the first gear 312 to rotate the thread-pushing rod 33 mounted on the second gear 313. At the same time, the thread 200 received in the first through hole 331 can rotate with the thread-pushing rod 33. When the third gear 322 rotates, the fourth gear 323 can rotate with the third gear 322 to revolve the mounting gear 324 on its own axis. When the mounting gear 324 rotates, the first bevel gear 325 can rotate, rotating the second bevel gear 3262. When the second bevel gear 3262 rotates, the first rotating member 3263 and the first spur gear 3264 can rotate. When the first spur gear 3264 rotates, the second spur gear 3271 meshing with the first spur gear 3264 can rotate rotating the second rotating member 3272. The first rotating member 3263 and the second rotating member 3272 can rotate in different directions. Because the tangent of the rotating direction of the first rotating member 3263 and the tangent of the rotating direction of the second rotating member 3272 are moved in the direction towards the thread-transmitting rod 34 at the contacting position of the first rotating member and the second rotating member 3272, the thread 200 can continually pass through the passage 328 driven by the first rotating member 3263 and the second rotating member 3272 to enter into the hole of the workpiece. After the thread 200 is pushed into the hole of the workpiece, the second pushing member 51 can drive the cutting member to rotate at an angle to cut the thread 200.

In an alternative embodiment, the rough positioning mechanism 10 and the accurate positioning mechanism 20 can be omitted, other mechanisms can be used to position. For example, the robotic controlling device can be used to control a robot (not shown) to move the transmitting mechanism 30 until the second through hole 341 is aligned with the hole of the workpiece.

In an alternative embodiment, a number of the sliding rails 13 can be one, the first sliding platform 22 can be slidably mounted on the sliding rail 13.

In an alternative embodiment, the moving rod 274 can be omitted, then the edge of the first eccentric wheel 25 can resist the third sliding platform 273.

In alternative embodiments, the rotating assembly 31, the third gear 322, the fourth gear 323, the mounting gear 324, the first bevel gear 325, and the second bevel gear 3262 can be omitted, then the first pushing member 321 rotates the second spur gear 3271 and the second rotating member 3272 via the first spur gear 3264. And the second rotating member 3272 and the first rotating member 3263 can rotate in different directions.

In an alternative embodiment, the cutting mechanism 50 can be omitted, the thread 200 can be cut by other methods, such as a knife (not shown) controlled by the robotic controlling device.

It is believed that the present embodiments and their advantages will be understood from the foregoing description, and it will be apparent that various changes can be made thereto without departing from the spirit and scope of the embodiments or sacrificing all of its material advantages.

What is claimed is:

1. A threading device configured to push a thread into a hole of a work piece, the threading device comprising:
    a thread-pushing rod having a first through hole defined therein,
    a thread-transmitting rod mounted on the thread-pushing rod and having a second through hole defined therein, the first through hole aligned with the second through hole,
    a first transmission subassembly and a second transmission subassembly both mounted on the thread-pushing rod, wherein the first transmission subassembly comprises:
        a first rotating member,
        a first spur gear mounted on the first rotating member;
    wherein the second transmission subassembly comprises:
        a second rotating member parallel with the first rotating member,
        a second spur gear mounted on the second rotating member and meshing with the first spur gear;
    wherein a passage is defined by the first rotating member and the second rotating member, the passage is configured to allow the thread to pass there through, and the passage is aligned with the first through hole and the second through hole,
    a first pushing member coupled to the first rotating member, the first pushing member configured to rotate the first rotating member, and further configured such that when the second spur gear and the second rotating member are rotated, the first rotating member and the second rotating member rotate in different directions, and at a contacting position of the first rotating member and the second rotating member, a tangent of a rotating direction of the first rotating member or a tangent of a rotating direction of the second rotating member are moved in a direction towards the thread-transmitting rod.

2. The threading device of claim 1, wherein the first rotating member has a first groove defined therein, the second rotating member has a second groove defined therein, the passage is defined by the first groove and the second groove.

3. The threading device of claim 1, wherein the threading device further comprises an accurate positioning mechanism, the accurate positioning mechanism comprises:
    a first sliding platform,
    a second sliding platform slidably mounted on the first sliding platform,
    a third sliding platform slidably mounted on the second sliding platform, wherein the first pushing member is mounted on the third sliding platform,
    a first eccentric wheel resisting the third sliding platform,
    a second eccentric wheel resisting the second sliding platform,
    a first driving member coupled to the first eccentric wheel and configured to rotate the first eccentric wheel, and
    a second driving member coupled to the second eccentric wheel and configured to rotate the second eccentric wheel.

4. The threading device of claim 3, wherein the second sliding platform has a moving hole defined therein, the accurate positioning mechanism further comprises a moving rod mounted on the third sliding platform and passing through the moving hole, the moving rod resists the first eccentric wheel.

5. The threading device of claim 3, wherein the threading device further comprises a rough positioning mechanism, the rough positioning mechanism comprises:
    a supporting platform,
    a cylinder coupled to the supporting platform and configured to drive the supporting platform to move, and
    a plurality of sliding rails mounted on the supporting platform, the first sliding platform is slidably mounted on the sliding rails.

6. The threading device of claim 1, wherein the threading device further comprises a rotating assembly, the rotating assembly comprises a third driving member coupled to the thread-pushing rod and configured to rotate the thread-pushing rod.

7. The threading device of claim 6, wherein the rotating assembly further comprises:
    a first gear mounted on the third driving member, and
    a second gear meshing the first gear, the thread-pushing rod is mounted on the second gear and stretches along an axis of the second gear, the third driving member is configured to rotate the first gear and then the second gear rotates via the first gear, to rotate the thread-pushing rod.

8. The threading device of claim 1, wherein the threading device further comprises a first bevel gear coupled to the first pushing member, the first transmission subassembly further comprises a second bevel gear mounted on the first rotating member and meshing the first bevel gear.

9. The threading device of claim 8, wherein the threading device further comprises:
    a third gear coupled to the first pushing member and rotated by the first pushing member,
    a fourth gear meshing the third gear, and
    a plurality of mounting gears meshing the fourth gear, one of the mounting gears coaxially mounted with the first bevel gear.

10. The threading device of claim 1, wherein the threading device further comprises a cutting mechanism, the cutting mechanism comprises:
    a second pushing member,
    a cutting member rotatably passing through a first end portion of the thread-transmitting rod away from the thread-pushing rod, and
    a coupling rod respectively coupled to the second pushing member and the cutting member; the cutting member has a cutting hole defined therein, the cutting hole is aligned with the second through hole, a diameter of a first end portion of the cutting hole is less than that of a second end portion of the cutting hole, the second end portion of the cutting hole is adjacent to the thread-pushing rod.

11. A threading device comprising:
    a thread-pushing rod having a first through hole defined therein,
    a thread-transmitting rod mounted on the thread-pushing rod and having a second through hole defined therein, the first through hole aligned with the second through hole,
    a first transmission subassembly and a second transmission subassembly both mounted on the thread-pushing rod, wherein the first transmission subassembly comprises:
        a first rotating member,
        a first spur gear mounted on the first rotating member;

wherein the second transmission subassembly comprises:
a second rotating member parallel with the first rotating member and defining a passage with the first rotating member, a tangent of the passage aligned with the first through hole and the second through hole,
a second spur gear mounted on the second rotating member and meshing with the first spur gear;
a first pushing member coupled to the first rotating member, the first pushing member configured to rotate the first rotating member.

12. The threading device of claim 11, wherein the first rotating member has a first groove defined therein, the second rotating member has a second groove defined therein, the passage is defined by the first groove and the second groove.

13. The threading device of claim 11, wherein the threading device further comprises an accurate positioning mechanism, the accurate positioning mechanism comprises:
a first sliding platform,
a second sliding platform slidably mounted on the first sliding platform,
a third sliding platform slidably mounted on the second sliding platform, wherein the first pushing member is mounted on the third sliding platform,
a first eccentric wheel resisting the third sliding platform,
a second eccentric wheel resisting the second sliding platform,
a first driving member coupled to the first eccentric wheel and configured to rotate the first eccentric wheel, and
a second driving member coupled to the second eccentric wheel and configured to rotate the second eccentric wheel.

14. The threading device of claim 13, wherein the second sliding platform has a moving hole defined therein, the accurate positioning mechanism further comprises a moving rod mounted on the third sliding platform and passing through the moving hole, the moving rod resists the first eccentric wheel.

15. The threading device of claim 13, wherein the threading device further comprises a rough positioning mechanism, the rough positioning mechanism comprises:
a supporting platform,
a cylinder coupled to the supporting platform and configured to drive the supporting platform to move, and
a plurality of sliding rails mounted on the supporting platform, the first sliding platform is slidably mounted on the sliding rails.

16. The threading device of claim 11, wherein the threading device further comprises a rotating assembly, the rotating assembly comprises a third driving member coupled to the thread-pushing rod and configured to rotate the thread-pushing rod.

17. The threading device of claim 16, wherein the rotating assembly further comprises:
a first gear mounted on the third driving member and rotated by the third driving member, and
a second gear meshing with the first gear, the thread-pushing rod is mounted on the second gear and stretches along an axis of the second gear.

18. The threading device of claim 11, wherein the threading device further comprises a first bevel gear coupled to the first pushing member, the first transmission subassembly further comprises a second bevel gear mounted on the first rotating member and meshing with the first bevel gear.

19. The threading device of claim 18, wherein the threading device further comprises:
a third gear coupled to the first pushing member and rotated by the first pushing member,
a fourth gear meshing with the third gear, and
a plurality of mounting gears meshing with the fourth gear, one of the mounting gears coaxially mounted with the first bevel gear.

20. The threading device of claim 11, wherein the threading device further comprises a cutting mechanism, the cutting mechanism comprises:
a second pushing member,
a cutting member rotatably passing through a first end portion of the thread-transmitting rod away from the thread-pushing rod, and
a coupling rod respectively coupled to the second pushing member and the cutting member; the cutting member has a cutting hole defined therein, the cutting hole is aligned with the second through hole, a diameter of a first end portion of the cutting hole is less than that of a second end portion of the cutting hole, the second end portion of the cutting hole is adjacent to the thread-pushing rod.

* * * * *